June 3, 1941.   W. E. POHL   2,244,313
CINEMATOGRAPHIC FILM REGISTRATION
Filed April 17, 1940   2 Sheets-Sheet 1
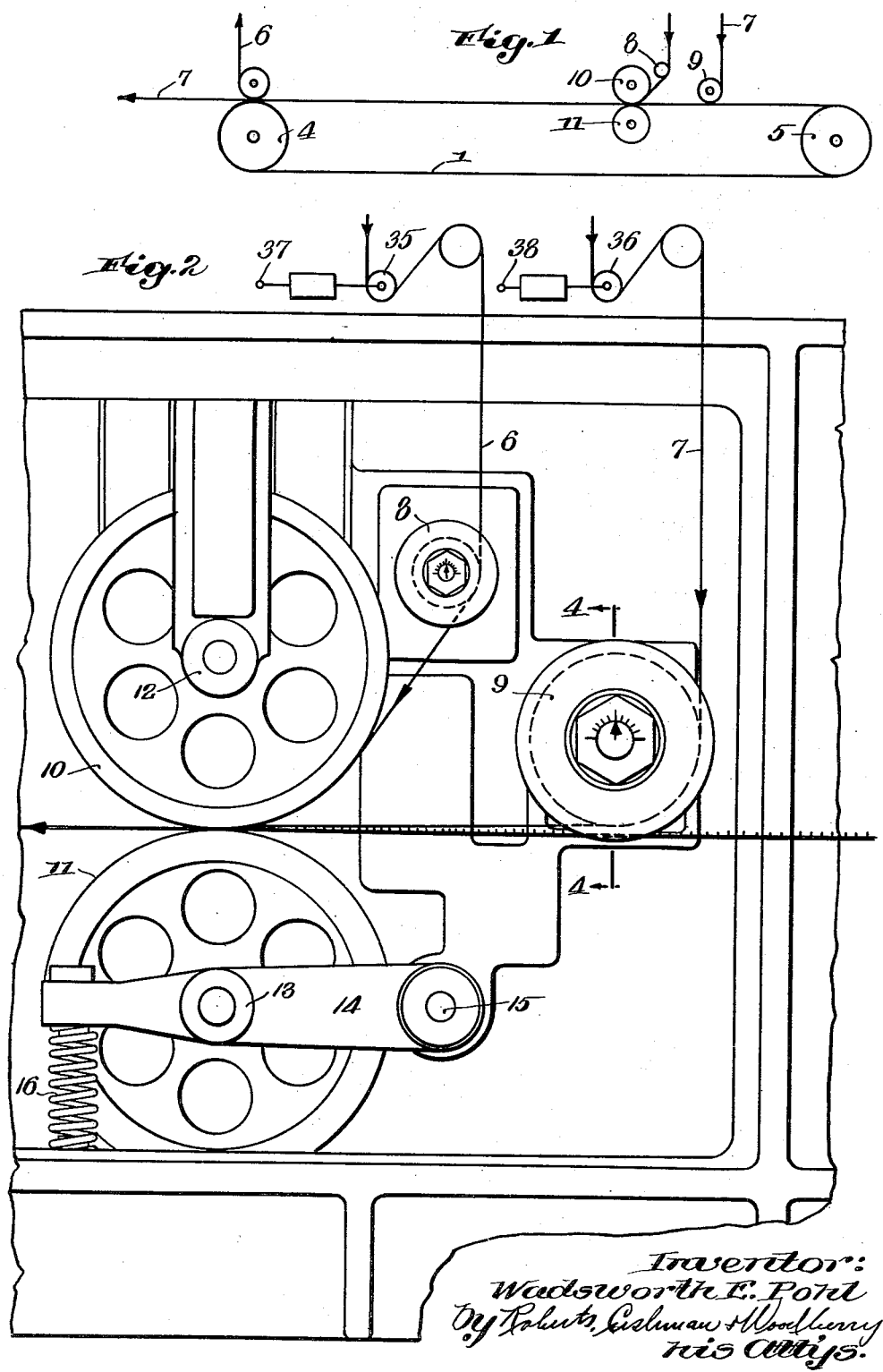

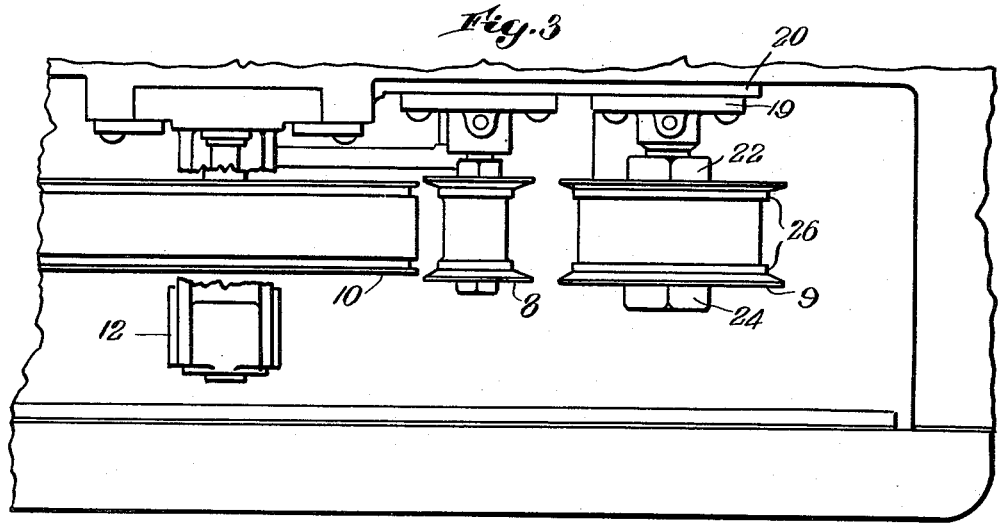
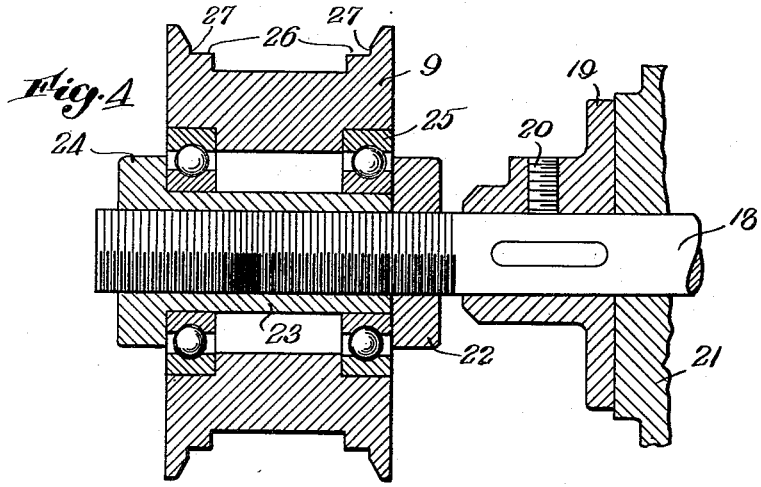
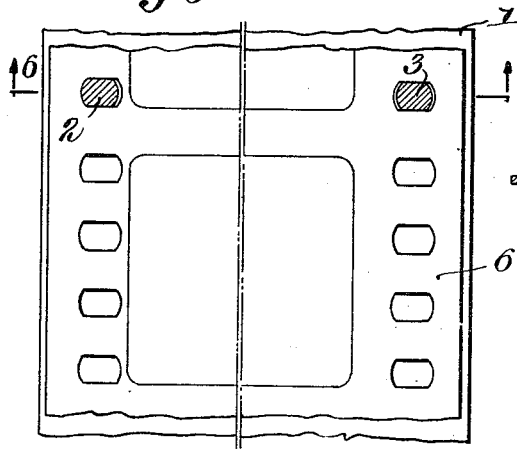

Patented June 3, 1941

2,244,313

UNITED STATES PATENT OFFICE 2,244,313

CINEMATOGRAPHIC FILM REGISTRATION

Wadsworth E. Pohl, Los Angeles, Calif., assignor to Technicolor Motion Picture Corporation, Los Angeles, (Hollywood), Calif., a corporation of Maine Application April 17, 1940, Serial No. 330,090

4 Claims. (Cl. 271—2.3)

In the art of motion pictures it is often necessary to register one film accurately with another film so that the pictures on both films bear precisely the same relationship to their sprocket holes respectively. For example, in printing color pictures by imbibition it is customary to make three relief matrices representing different color aspects of a scene and, after wetting the relief matrices with the appropriate dyes, to press them successively against a blank film to print the three color images in superposition on the imbibition film. To make the printed images register with each other the printing images of the matrices are each positioned in precisely the same relationship to the adjacent sprocket holes with which the matrices are positioned while being printed and again while pressed against the aforesaid blank film in the subsequent imbibition stage of the process. Ordinarily the register means comprise teeth which project into the sprocket holes of the film. Usually only a single pair of teeth is provided but sometimes the register means comprises a series of teeth traveling in an orbital path, the film being fed on and off the teeth at spaced locations along the path. While the series of teeth may be on a drum or wheel they are preferably located on a traveling belt as disclosed for example in the patent to Daniel F. Comstock, No. 1,707,710, granted April 2, 1929, and the application of Gerald F. Rackett, Serial No. 340,120, filed June 12, 1940.

If the aforesaid teeth exactly fit the sprocket holes the film may be accurately registered both lengthwise and edgewise of the film, but due to wear on the teeth in repeatedly moving film on and off the teeth they gradually become smaller than the holes so that the film may occupy any one of several positions relatively to the teeth. For example the film may be displaced edgewise of the film anywhere between a position in which the right-hand edges of the sprocket holes engage the right-hand sides of the teeth to a position in which the left-hand edges of the sprocket holes engage the left-hand sides of the teeth. Thus if one film is displaced to the right and another film is displaced to the left the two films would be out of register relatively to each other by an amount equal to twice the difference between the sizes of the tooth and hole. Assuming the difference between the size of the teeth and the size of the holes of each film is one-thousandth of an inch, if the films are superposed with one film against the right-hand side of the teeth and the other film against the left-hand side of the teeth the films are out of register relatively to each other two-thousandths of an inch, an amount which is twice the difference between the size of the teeth and the size of holes of each film.

For example, in printing the aforesaid matrices from color-separation negatives (either directly or through the medium of dupe negatives) on a contact printer such as disclosed in the aforesaid application, in contacting one pair of films (negative and matrix) the matrix may engage the right-hand side of the belt teeth and in contacting another pair the matrix may engage the left-hand side of the teeth. Assuming the pictures on the two negatives to bear the same relationship to their sprocket holes respectively and assuming the negatives to fit the teeth snugly (because of shrinkage in development e. g.), the positions of the pictures on the two matrices may differ by an amount equal to twice the difference between the dimensions of a belt tooth and matrix hole, as for example if the pictures are displaced to the left on one matrix and to the right on the other matrix. Thus in subsequently printing the matrix pictures in superposition on a single imbibition film, as disclosed for example in the aforesaid patent, the different color pictures would not register on the imbibition film because of the displacement of the pictures on the matrix films. This lack of registration would result even though the register teeth of the imbibition machine completely fill the sprocket holes of both the matrices and the imbibition film, but if the teeth of the imbibition machine are smaller than the holes of the matrices or imbibition film the aforesaid error would develop in the imbibition machine. Thus the error may occur in printing the matrices from the negatives or in printing the imbibition film with the matrices or in both printing operations.

The object of the present invention is to provide a method and an apparatus which reduce the aforesaid effect of wear on register teeth and which therefore permit the apparatus to be used longer before the register error passes beyond the permissible limit.

According to this invention the film is guided upon the register teeth (or the register teeth are guided into the sprocket holes) with the same sides of the sprocket holes (e. g the right sides) always seating against the corresponding sides (e. g. the right sides) of the register teeth so that, when the holes are larger than the teeth, the film may be displaced relatively to the teeth only in one direction edgewise of the film. Thus the same sides of all sprocket holes engage the same sides of the register pins. Consequently all the pictures on all the films bear the same relation to said sides of the sprocket holes irrespective of the condition of the pins; that is the pictures are always in register in the sense that they bear the same relationship to the same sides of their adjacent sprocket holes respectively.

For the purpose of illustration a typical embodiment of the invention is shown in the accompanying drawings in which Fig. 1 is a diagrammatic view showing the general relationship of the various parts of the apparatus;

Fig. 2 is a side elevation of a part of the apparatus;

Fig. 3 is a top plan view;

Fig. 4 is a section on line 4—4 of Fig. 2;

Fig. 5 is a plan view of sections of film on the toothed register belt, a pair of the teeth being shown in section; and Fig. 6 is a section on line 6—6 of Fig. 5.

The particular embodiment of the invention chosen for the purpose of illustration comprises a thin flexible metallic belt 1 which is perforated like a motion picture film and which has register teeth 2 and 3 soldered or otherwise secured in the openings (Fig. 6). The teeth 2 at one side of the belt are intended to fill the sprocket holes of the film both crosswise and lengthwise of the film whereas the teeth 3 at the other side of the belt are intended to fill the sprocket holes of the film only lengthwise of the film. Thus the teeth 2 position the film relatively to the belt both lengthwise and crosswise of the film whereas the teeth 3 only position the film lengthwise of the film. The belt 1 is an endless belt and is caused to travel in an orbital path by any suitable means as for example the pair of drums 4 and 5 shown diagrammatically in Fig. 1. The belt may be caused to travel around its orbital path by rotating one or both of the drums 4 and 5 or by pulling on one or both of the films 6 or 7, which may for example constitute the aforesaid imbibition and matrix films respectively.

As shown in Figs. 1 and 2 the two films 6 and 7 are fed tangentially to the belt 1 over guide rollers 8 and 9, the films being seated firmly on the belt by two pressure rollers 10 and 11. The roller 10 is journaled in stationary bearings 12 whereas the roller 11 is journaled in bearings 13 mounted on arms 14 pivoted at 15, the arms being pressed in a clockwise direction by means of spring 16 to press the films snugly against the belt. In imbibition printing the rollers 8, 9, 10 and 11 may be submerged in a tank of water to avoid inclusion of bubbles between the two films when they are pressed together at the rollers 10 and 11, as disclosed for example in the aforesaid patent. After the films are pressed on the teeth of the belt they travel with the belt throughout a predetermined distance to permit transfer of the dye from the matrix 7 to the imbibition film 6, the two films being led away from the belt at a suitable location along the aforesaid orbital path as illustrated in Fig. 1.

In order to guide each film to the belt always with the same edges of the sprocket holes bearing against the same sides of the teeth, each of the rollers 8 and 9 is provided with micrometer means for precisely adjusting the rollers edgewise of the film. As shown in Fig. 4 this means may comprise a threaded stud 18 mounted in a collar 19 by means of a set screw 20, the collar 19 being mounted on the frame 21 as shown in Fig. 3. Threaded on the stud 18 is a nut 22 and a sleeve 23 having a flange 24. The roller is mounted on the sleeve 23 through the medium of ball bearings 25. By threading the sleeve 23 to the right or the left the roller may be adjusted edgewise of the film, the nut 22 serving to lock the sleeve in adjusted position. Each of the rollers 8 and 9 is provided with shoulders 26 upon which the associated film bears, with the edges of the film adjacent the radial faces 27 which serve to position the film edgewise. Thus each film may be guided to the belt 1 so that, even though the teeth 2 are worn smaller than the sprocket holes, the left-hand edges of the sprocket holes always engage the left-hand sides of the teeth 2 or vice versa.

If it is desired always to seat the leading edges of the sprocket holes against the forward sides of the pins, tensioning means may be associated with the films as they approach the belt, thereby to draw the leading edges of the sprocket holes back against the leading sides of the teeth as the films are fed to the belt. As shown in Fig. 2 the tensioning means may comprise rollers 35 and 36 mounted on weighted arms which are pivotally supported at 37 and 38.

It should be understood that the present disclosure is for the purpose of illustration only and that this invention includes all modifications and equivalents which fall within the scope of the appended claims.

I claim:

1. In the art of registering cinematographic film with register teeth extending into register holes in the film which are larger than the teeth, the method of reducing inaccuracy of register which comprises feeding a plurality of films on the teeth and seating corresponding edges of the register holes of the films against the sides of the register teeth.

2. In the art of registering cinematographic film with register holes to receive register teeth, the method of reducing inaccuracy of register which comprises guiding the film on the teeth with the same edges of the holes always engaging the corresponding sides of the teeth so that, when the holes are larger than the teeth, the film may be displaced relatively to the teeth only in one direction edgewise of the film.

3. Cinematographic apparatus comprising a film carrier having an endless series of teeth for engagement in register holes of the film, means for moving the carrier so that the teeth travel in an orbital path, means for guiding the film tangentially to the carrier so that said teeth move into said holes progressively, and means for adjusting said guide means edgewise of the film to cause the same sides of said holes always to engage the corresponding sides of said teeth irrespective of the degree of wear on the teeth, whereby when the holes are larger than the teeth the film may be displaced edgewise only in one direction relatively to the teeth.

4. Cinematographic apparatus comprising a film carrier having an endless series of teeth for engagement in register holes of the film, means for moving the carrier so that the teeth travel in an orbital path, a roller for guiding the film tangentially to the carrier so that said teeth move into said holes progressively, and micrometer means for adjusting said roller edgewise of the film to cause the same sides of said holes always to engage the corresponding sides of said teeth irrespective of the degree of wear on the teeth, whereby when the holes are larger than the teeth the film may be displaced edgewise only in one direction relatively to the teeth.

WADSWORTH E. POHL.